United States Patent [19]
Watanabe et al.

[11] Patent Number: 5,661,834
[45] Date of Patent: Aug. 26, 1997

[54] OPTICAL SEMICONDUCTOR MODULE AND A METHOD FOR FABRICATING THE SAME

[75] Inventors: Hideki Watanabe; Yuji Sakazaki, both of Kanagawa-ken, Japan

[73] Assignee: Mitsubishi Denki Kabushiki Kaisha, Tokyo, Japan

[21] Appl. No.: 348,372

[22] Filed: Dec. 1, 1994

[30] Foreign Application Priority Data

Dec. 28, 1993 [JP] Japan ................. 5-335999
Apr. 6, 1994 [JP] Japan ................. 6-068629

[51] Int. Cl.⁶ ........................................... G02B 6/32
[52] U.S. Cl. ................... 385/92; 385/93; 385/88
[58] Field of Search ................... 385/92, 88–94, 385/33

[56] References Cited

U.S. PATENT DOCUMENTS

| | | | |
|---|---|---|---|
| 4,875,752 | 10/1989 | Suzuki | 385/88 |
| 4,979,791 | 12/1990 | Bowen et al. | 385/92 |
| 5,040,862 | 8/1991 | Burton et al. | 385/33 |
| 5,073,047 | 12/1991 | Suzuki et al. | 385/93 |
| 5,127,074 | 6/1992 | Watanabe et al. | 385/92 |
| 5,191,629 | 3/1993 | Kaiser | 385/93 |
| 5,307,435 | 4/1994 | Chihara | 385/92 |

FOREIGN PATENT DOCUMENTS

| | | | |
|---|---|---|---|
| 0490541 | 6/1992 | European Pat. Off. | 385/92 |
| 3-259106 | 11/1991 | Japan | 385/92 |
| 2233787 | 1/1991 | United Kingdom | 385/92 |

*Primary Examiner*—Phan T. H. Palmer
*Attorney, Agent, or Firm*—Wolf, Greenfield & Sacks, P.C.

[57] ABSTRACT

There is provided an optical semiconductor module of a receptacle type having an optical semiconductor element, a housing for supporting said optical semiconductor element and a ferrule bore formed in said housing and engaged with a ferrule of an optical fiber connector, and a sleeve formed separately from said housing as a cylindrical member having an inner bore and fixed to the inside of said housing so as to enable said inner bore to be employed as said ferrule bore. The optical semiconductor module can be prepared with ease and with highly accurate dimensions.

29 Claims, 5 Drawing Sheets

5,661,834

OPTICAL SEMICONDUCTOR MODULE AND A METHOD FOR FABRICATING THE SAME

BACKGROUND OF THE INVENTION

1. Field of the Invention

The present invention relates to an optical semiconductor module or a photodiode module for use in optical communications or the like and a method for fabrication of the same.

2. Description of the Related Art

FIG. 11 is a sectional view showing an example of a conventional optical semiconductor module. As shown in FIG. 11, reference numeral 1 denotes an optical semiconductor module to which an optical fiber terminal 2 is mounted. The optical semiconductor module 1 comprises a housing 6 and an optical semiconductor element 11, the housing 6 having a ferrule bore 5 acting as an alignment bore for aligning a ferrule 4 holding an optical fiber 3 of the optical fiber terminal 2 and the optical semiconductor element 11 being mounted in a position opposite the ferrule bore 5 to the housing 6 and being sealed by a cap 10 having a lens 9 with a laser chip 7 mounted to a stem 8. The optical semiconductor element 11 is fixed with an adhesive 12 to the housing 6 after the optical axis has been adjusted so as to gather optical outputs into the optical fiber 3 mounted to the ferrule bore 5.

The outputs emitted from the laser chip 7 are gathered through the lens 9 onto the central portion on the bottom surface of the ferrule bore 5 and sent to the optical fiber terminal 2 as given signals.

Conventional optical semiconductor modules generally have the structure as described hereinabove. One critical character which affects the performance of the optical semiconductor modules reside in how a loss in connection with the optical fiber terminal 2 can be reduced by improving the degree of accuracy in fabricating the ferrule bore 5 acting as the alignment bore for aligning the ferrule 4, and by minimizing a gap between the ferrule 4 and the ferrule bore 5 at the time when the ferrule 4 inserted into the ferrule bore 5 of the housing 6, and also how accurately the optical semiconductor element 11 can be fixed to the housing 6 so as to focus the outputs emitted from the laser chip 7 onto the central portion on the bottom surface of the ferrule bore 5. In particular, the structures of the conventional optical semiconductor modules require the ferrule bore 5 of the housing 6 to be fabricated or processed with high accuracy in a cylindrical or circular shape, with no gap or minimal gap existing between the ferrule 4 and the ferrule bore 5. When a single-mode fiber is employed as the optical fiber 3, the diameter of the optical path should be as small as about 10 microns and the accuracy of the ferrule bore 5 should be in the order of less than several microns in terms of each of the tolerance of diameter and circularity. A large number of steps for fabrication is required in order to achieve such a high degree of accuracy. In particular, as the material to be utilized for the housing 6 is generally a metal, mechanical processing is required to fabricate the housing 6. Further, since the diameter of the ferrule 4 is as small as approximately 2.5 mm, and surface roughness must be minute, as resistance to friction upon attachment or detachment of the ferrule 4 is taken into account, productivity is greatly restricted.

SUMMARY OF THE INVENTION

The object of the present invention is to provide an optical semiconductor module and a method for the fabrication of the same, which is highly economical, which can solve the problems inherent in the conventional ones associated with optical semiconductor modules of the prior art and which can provide a means for processing ferrule bores at a high rate of productivity.

In order to achieve the above object, the present invention provides an optical semiconductor module comprising a cylindrical sleeve fixed to a housing, the cylindrical sleeve being prepared separately and independently by injection molding a resin and having a ferrule bore formed in the inner portion of the sleeve for engagement with a ferrule part of an optical fiber connecter, the housing being prepared from a metallic material adapted to fix and hold an optical semiconductor element.

As the resin to be subjected to injection molding in accordance with this invention, there may be employed a resin modified by adding an inorganic material so as to provide the resultant resin with a thermal coefficient of expansion substantially equal to or similar to that of the metallic material employed for the housing.

In another aspect of this invention, the cylindrical sleeve to be employed for this invention is provided at its outer peripheral portion with an elastically deformable projection and the cylindrical sleeve is squeezed or pressed into and fixed to the housing.

In the present invention, the housing is provided at the portion corresponding to the ferrule bore in advance with a sleeve bore having a diameter larger than the diameter of the ferrule with the sleeve being subjected to inner molding with a resin to thereby make, the sleeve having the ferrule bore of a predetermined accuracy of dimension integral with the housing.

In a further aspect of this invention, the housing is provided in the position corresponding to the ferrule bore in advance with a sleeve bore having a diameter larger than the diameter of the ferrule bore. On the other hand, the cylindrical sleeve is prepared separately by injection molding the resin, the ferrule bore is formed in the cylindrical sleeve as a bore having an inner circumference of a predetermined accuracy in dimension relative to the outer circumference of the outer diameter of the ferrule, the sleeve being inserted into the sleeve bore of the housing made of a metallic material for fixing and holding the optical semiconductor element and fixed in advance to the housing with an adhesive having elasticity after the injection-molded sleeve has been cured.

In a still further aspect of this invention, the housing to be employed for this invention is provided in advance with an accurate sleeve bore in a position corresponding to the ferrule bore of the sleeve when inserted thereinto, the diameter of the accurate sleeve bore being greater than that of the ferrule bore and having dimensions as accurate as the ferrule having such a degree of dimensional accuracy required by the ferrule bore; the ferrule bore is formed in a split sleeve prepared by roll processing a plate material having a constant plate thickness so as to allow its outer circumference to be engaged with the sleeve bore and its inner circumference to be engaged with the ferrule bore in a predetermined dimension. The split sleeve is then fixed in advance to the housing.

An additional aspect of this invention is structured in such a manner that the housing is provided in advance at the portion corresponding to the ferrule bore with a sleeve bore having a diameter greater than the diameter of the ferrule bore; the ferrule bore is formed in the cylindrical sleeve prepared separately by subjecting a resin having elasticity to injection molding so as to make its outer circumference smaller in diameter than the sleeve bore and for the circumference of its inner portion to be as accurate in dimension as the length of the ferrule and constant in thickness and to require no circularity; and the cylindrical sleeve is squeezed and pressed into the housing and mounted thereto.

The present invention is characterized by a still further aspect that the cylindrical sleeve prepared separately by subjecting the resin to injection molding is provided with a ferrule bore as a triangular bore in which an inscribed circle diameter is smaller by a predetermined amount than the outer diameter of the ferrule and the circumference of which is greater than the circumference of the ferrule and that the sleeve is fixed in advance to the housing for fixing and holding the optical semiconductor element.

In a still further aspect of this invention, a receptacle is structured in such a manner that a ferrule bore is formed in the cylindrical sleeve prepared separately by injection molding the resin and the cylindrical sleeve is assembled with the housing.

In a further additional aspect of this invention, a ferrule bore is formed in the inner portion of the cylindrical sleeve as a bore having a predetermined accuracy of dimension, the sleeve being prepared separately by injection molding the resin containing an inorganic material and having a thermal coefficient of expansion similar to that of the material for the housing. Further, the sleeve is fixed in advance to the housing made of a metallic material for fixing and holding the optical semiconductor element and the optical semiconductor element is fixed to the housing by adjusting the alignment of the optical semiconductor element with the ferrule so as to allow the central optical axis of the optical semiconductor element to coincide with the central axis of the ferrule bore.

A still further aspect of this invention is such that the ferrule bore is formed in the inner portion of the cylindrical sleeve as a bore having a predetermined accuracy of dimension, the sleeve being prepared separately by injection molding the resin and having an elastically deformable projection at its outer peripheral portion, the sleeve is squeezed or pressed into the housing for fixing and holding the optical semiconductor element by deforming the projection disposed at its outer peripheral portion, the housing being made of a metallic material, and the optical semiconductor element is then fixed to the housing by adjusting the alignment of the optical semiconductor element with the ferrule bore so as to allow the central optical axis of the optical semiconductor element to coincide with the central axis of the ferrule bore.

The present invention is characterized by a still further aspect wherein a sleeve bore having a diameter greater than the diameter of the ferrule bore is formed in advance at the portion corresponding to the ferrule bore in the housing and a cylindrical sleeve containing the ferrule bore of a predetermined accuracy of dimension is integrally molded with the housing by subjecting the sleeve bore to inner molding with the resin, followed by fixing of the optical semiconductor element to the housing by aligning the center of the optical axis of the optical semiconductor element with the ferrule bore so as to allow the central optical axis of the optical semiconductor element to coincide with the central axis of the ferrule bore.

In a still further aspect of this invention, a sleeve bore having a diameter larger than the diameter of the ferrule bore is formed in advance at the portion corresponding to the ferrule bore in the housing; the ferrule bore is formed in the cylindrical sleeve as a bore with its inner circumference having a predetermined accuracy of dimension with respect to the outer circumference of the diameter of the ferrule, the sleeve being prepared separately by injection molding the resin; the sleeve is fixed with an adhesive having elasticity in advance to the housing for fixing and holding the optical semiconductor element after the injection-molded sleeve has been cured, the housing being made of a metallic material; and the optical semiconductor element is fixed to the housing by aligning the optical semiconductor element with the ferrule bore so as to allow the central optical axis of the optical semiconductor element to coincide with the central axis of the ferrule bore.

A still further aspect of this invention is such that the housing to be employed for this invention is provided in advance at a portion corresponding to the ferrule bore with an accurate sleeve bore having the diameter greater than that of ferrule bore and having an accuracy of dimension as high as the ferrule having the accuracy of dimension required by the ferrule bore; the ferrule bore is formed in a split sleeve being prepared by roll processing a plate material having a constant plate thickness so as to allow its outer circumference to be engaged with the sleeve bore and its inner circumference to be engaged with the ferrule bore in a predetermined dimension; the split sleeve is then fixed in advance to the housing; and the optical semiconductor element is fixed to the housing by adjusting the alignment of the optical semiconductor element with the ferrule bore so as to allow the central optical axis of the optical semiconductor element to coincide with the central axis of the ferrule bore.

This invention is characterized by a still further aspect in that the housing is provided at the portion corresponding to the ferrule bore with the sleeve bore having a diameter larger than the diameter of the ferrule bore; the ferrule bore is formed in the cylindrical sleeve prepared separately by injection molding the resin having elasticity as a bore the outer circumference of which is smaller than the sleeve bore and having the inner circumference of a predetermined accuracy of dimension with respect to the length of the ferrule and having a constant thickness as well as requiring no circularity; the sleeve is squeezed and pressed in advance into the housing for fixing and holding the optical semiconductor element, made of the metallic material; and the optical semiconductor element is fixed to the housing by aligning the optical semiconductor element with the ferrule bore so as to allow the central optical axis of the optical semiconductor element to coincide with the central axis of the ferrule bore.

The present invention is further characterized by a still further aspect that the sleeve prepared separately by injection molding the resin is provided with a triangular ferrule bore with an inscribed circle smaller by a predetermined amount than the outer size of the ferrule and an circumference longer than the circumference of the ferrule; the sleeve is fixed in advance to the housing for fixing and holding the optical semiconductor element; and the optical semiconductor element is fixed to the housing by adjusting the alignment of the optical semiconductor element with the ferrule bore so as to allow the central optical axis of the optical semiconductor element to coincide with the central axis of the ferrule bore.

Other objects, features and advantages of this invention will become apparent in the course of the following description of this specification with reference to the accompanying drawings.

DESCRIPTION OF THE PREFERRED EMBODIMENTS

The present invention will be described in more detail by way of examples with reference to the accompanying drawings.

Figure 1:
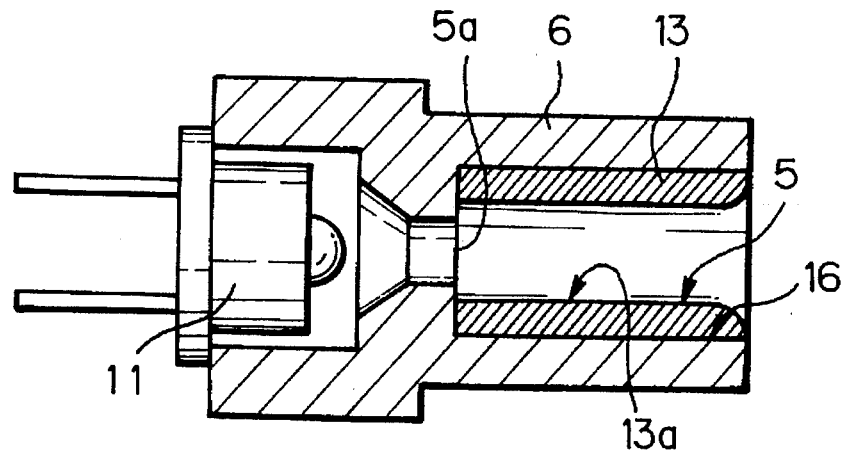
FIG. 1 is a cross-sectional view showing an optical semiconductor module according to a first embodiment of this invention.
Figure 2:
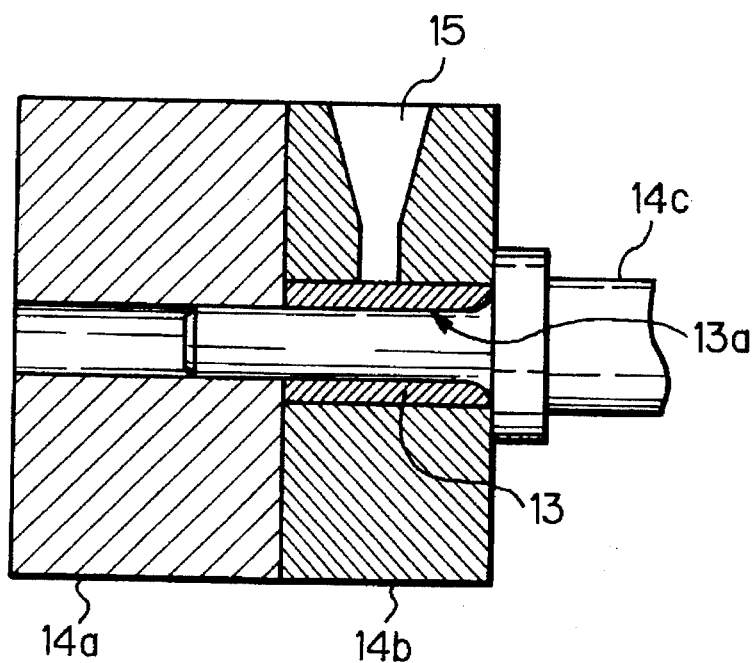
FIG. 2 is a cross-sectional view showing a mold for describing the method for molding a sleeve of the optical semiconductor module of FIG. 1.

First Embodiment:

As shown in FIG. 1, reference numeral 13 denotes a cylindrical sleeve having a ferrule bore 5 having a predetermined accuracy of dimension and reference numeral 6 denotes a housing made of a metallic material weldable to an optical semiconductor element 11. As shown in FIG. 2, prepared separately by subjecting a resin to injection molding comprising pouring the resin in a molten state through a gate 15 into a mold consisting of a combination of a lower mold section 14a and an upper mold section 14b with a core pin 14c, the resin which may be modified so as to provide the resultant resin with substantially the same thermal coefficient of expansion as the metallic material to be employed for the housing 6 by adding to the resin a predetermined amount of an inorganic material, such as finely divided powders of potassium titanate or glass beads or tungsten carbide whisker. Then, the sleeve 13 is inserted into and fixed to a sleeve bore 16 of the housing 6 having the shape, as shown in the drawing, and the optical semiconductor element 11 is arranged and adjusted to be aligned so as to converge the optical axis upon the central portion on a bottom surface 5a of the ferrule bore 5, followed by fixing the optical semiconductor element 11 to the housing 6 by welding.

Although the core pin 14c having a high degree of accuracy is required for forming an inner bore 13a in the sleeve 13, the accuracy in size and shape of the ferrule bore 5 and surface roughness can be controlled by using the core pin 14c and no special operation is required for adjusting a deviation in position of the sleeve 13 with respect to the housing 6 due to the surface roughness on the outer circumferential surface of the sleeve 13. This is because the optical semiconductor element 11 can be adjusted and aligned with the housing 6 after the sleeve 13 has been mounted to the housing 6. Hence, the core pin 14c can continue to be used for the production of the sleeves 13 until the core pin 14c has been worn out. Generally, one core pin can be used for producing several hundreds thousand units of the sleeves 13 unit the mold has been worn out so that it is useful for the production of a large number of sleeves. Further, the sleeve 13 is of a simple cylindrical shape and it can be mounted to the housing 6 with ease so that it is also useful for automatic assembly using a robot and the like.

The optical semiconductor module in the first embodiment of this invention is highly economical because it is suitable for mass production and for automatic assembly.

Figure 3:
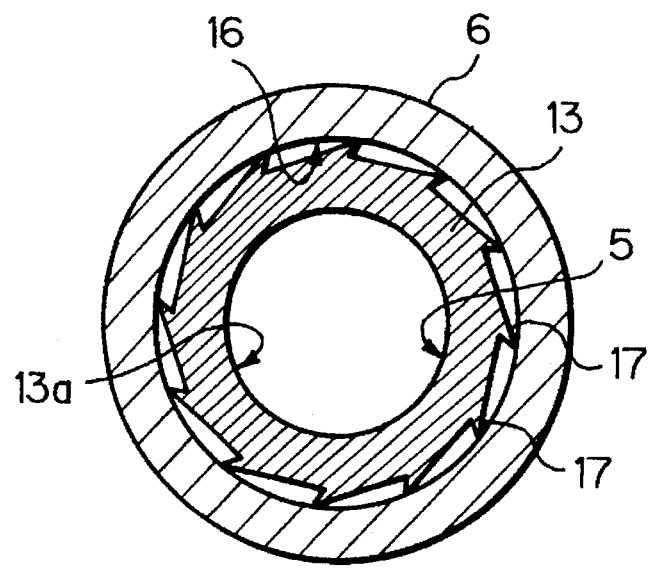
FIG. 3 is a cross-sectional view showing an essential portion of an optical semiconductor module according to a second embodiment of this invention, when looked in the direction perpendicular to the lengthwise axes of the housing and the sleeve, in order to indicate the state of connection of the housing with the sleeve.

Second Embodiment:

The optical semiconductor module in the second embodiment of this invention will be described mainly with reference to FIG. 3. The structure of this optical semiconductor module is substantially the same as that of the optical semiconductor module in the first embodiment of this invention, with exception that the sleeve 13 is of such a shape as shown in FIG. 3. FIG. 3 is a cross-sectional view indicating the housing 6 with the sleeve 13 inserted therein and mounted thereto, when looked from the side perpendicular to the axes of the housing and the sleeve. As shown in FIG. 3, the cylindrical sleeve 13 has projection portions 17 formed in equal spatial arrangement on its outer circumferential portion, each of the sleeves 13 being larger to some extent with respect to the sleeve bore 16, and having the ferrule bore 5 of a predetermined accuracy of dimension. The sleeve 13 can be prepared separately by injection molding of a resin having a thermal coefficient of expansion similar to that of the material to be employed for the housing 6. To the resin may be added an inorganic material so as to provide the resin with such a thermal coefficient of expansion. The sleeve 13 may prepared by a mold having grooves corresponding to the projection portions 17 formed on the upper mold section 14b as shown in FIG. 2. Each of the projection portions 17 may be of such a sawtooth-shaped form, as shown in FIG. 3, as preventing the sleeve 13 from detaching from the sleeve bore 16 of the housing 6 by allowing the sleeve 13 to maintain its squeezed and pressed-in state due to its elastically deformed state and at the same time alleviating the pressing-in stress so as to cause no deformation of the ferrule bore 5 at the time when the sleeve 13 is being squeezed and pressed in the sleeve bore 16 of the housing 6.

The sleeve 13 is then fixed to the housing 6 after it has been squeezed into the sleeve bore 16 thereof and the optical semiconductor element 11 is aligned with sleeve 13 so as to cause the optical axis to converge onto the central portion on the bottom surface of the ferrule bore 5, followed by welding the optical semiconductor element 11 to the housing 6.

It can be noted that, although the production of the sleeves 13 requires a highly accurate mold for injection molding, the sleeves 13 can be prepared by managing the accuracy of shape of their ferrule bores 5. In addition, no special operation other than that for accurately shaping the ferrule bore 5 is required for the production of the sleeves 13 because a deviation of the position of the sleeve 13 with respect to the housing 6 can be adjusted by aligning the optical semiconductor element 11 with the housing 6 after the sleeve 13 has been mounted and fixed to the housing 6. Further, the shape of the projection portion 17 is not restricted to the saw-tooth-like shape and a variety of moldable shapes such as a hemispherical shape or a screw-like shape is possible. In this embodiment, as the sleeve 13 is of a simple cylindrical shape, it can be readily mounted to the housing 6, without requiring adhesion or welding, simply by squeezing the sleeve 13 into the sleeve bore 16 of the housing 6 and holding the sleeve 13 therein in a pressed-in state so that the process of the assembly is very simple and automatic assembly can readily be effected using a simple robot or the like.

Figure 4:
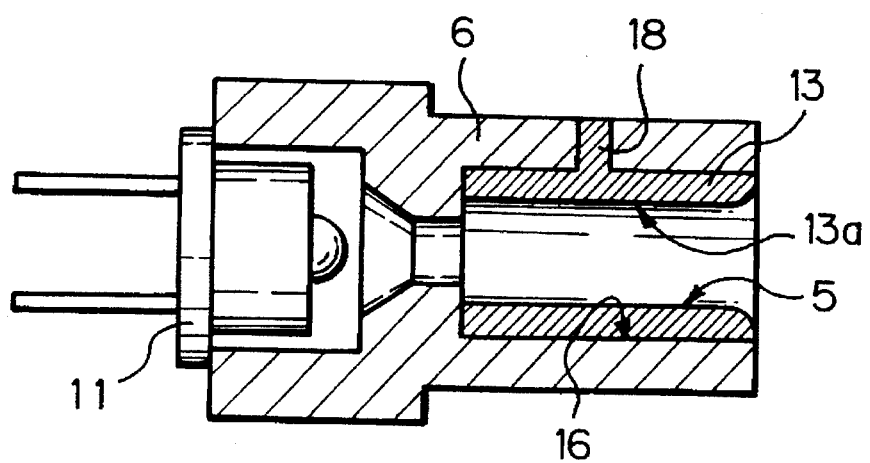
FIG. 4 is a cross-sectional view showing a third embodiment of this invention.
Figure 5:
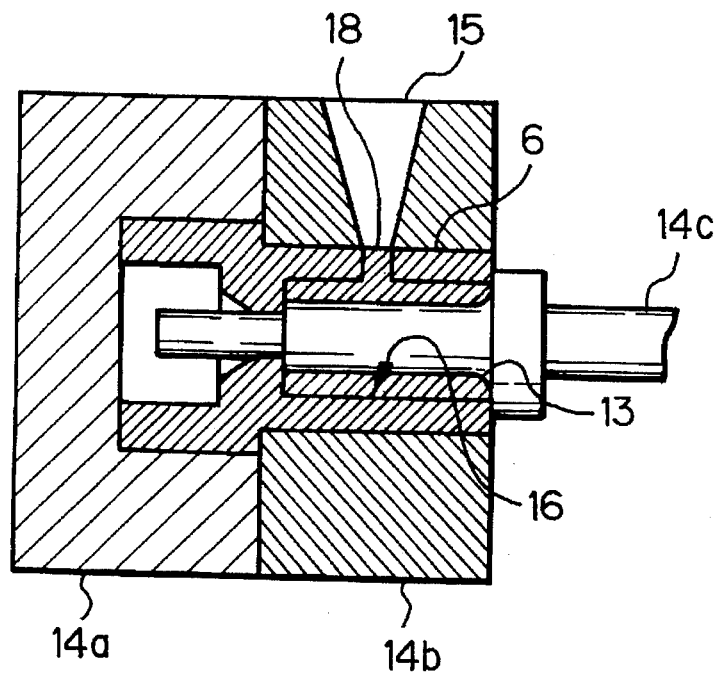
FIG. 5 is a cross-sectional view showing the housing of the mold and the housing for describing the method for forming the sleeve in the optical semiconductor module of FIG. 4.

Third Embodiment:

FIGS. 4 and 5 are directed to the third embodiment of the optical semiconductor module according to this invention. As shown in FIG. 4, reference numeral 13 denotes a sleeve as a cylindrical part having a ferrule bore 5 having a predetermined accuracy of dimension. As shown in FIG. 5, the housing 6 is inserted into the lower mold section 14a as well as the upper mold section 14b and the core pin 14c are mounted to the lower mold section 14a. Into the sleeve bore 16 of the housing 6 is inserted the sleeve 13 and a resin is inserted from a gate 15 through an inlet 18 into the sleeve bore 16, i.e. a gap between the inner circumferential wall surface of the sleeve bore 16 and the outer circumferential rod surface of the sleeve 13, thereby subjecting the resin to inner molding and making the sleeve 13 integral with the housing 6. Then, the optical semiconductor element 11 is mounted to the housing 6 and the position of the optical semiconductor element 11 is adjusted and aligned with the housing 6, i.e. the sleeve 13 mounted to the housing 6 so as for the optical axis to converge onto the central portion on the bottom surface of the ferrule bore 5. After the alignment has been completed, the optical semiconductor element 11 is fixed to the housing 6 by welding the former to the latter.

In the third embodiment as described hereinabove, no special step is required because the sleeve 13 is assembled with the housing 6 at the time of molding. It can be noted herein that, although the molding of the sleeves 13 requires a highly accurate mold for injection molding, the sleeves 13 can be prepared by managing the accuracy of shape of their ferrule bores 5 to a great extent. In addition, no special operation other than that for accurately shaping the ferrule bore 5 is required for the production of the sleeves 13 because a deviation of the position of the central axis of the inner bore 13a of the sleeve 13 can be adjusted by aligning the optical semiconductor element 11 with the housing 6. It can further be noted that the resin to be employed for the production of the sleeve 13 can be modified by adding thereto an inorganic material so as to provide a thermal coefficient of expansion substantially equal to that of the material to be employed for the production of the housing 6 and, as a consequence, that a thermal deformation of the housing 6 to be caused by a variation in temperature upon the housing 6 does not exert any influence upon the ferrule bore 5.

Figure 6:
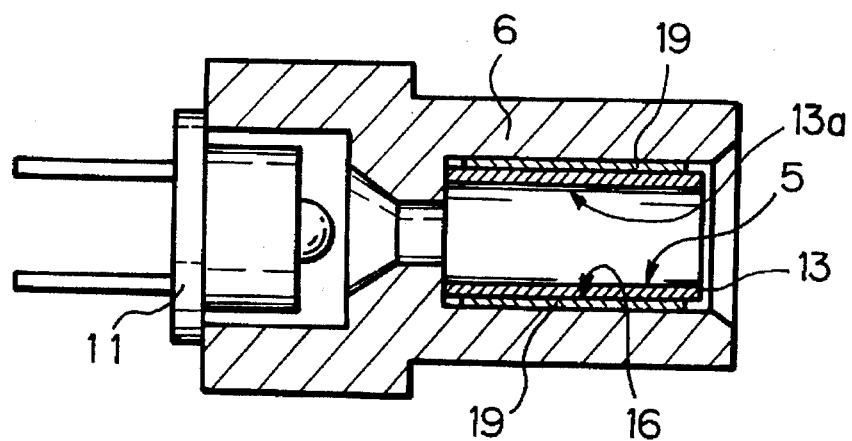
FIG. 6 is a cross-sectional view showing a fourth embodiment of this invention.

Fourth Embodiment:

FIG. 6 is directed to the fourth embodiment of the optical semiconductor module according to this invention. As shown in FIG. 6, the housing 6 for fixing and holding the optical semiconductor element 11, made of the metallic material, is provided with the sleeve bore 16 having a diameter larger than the diameter of the ferrule bore 5. The thin and cylindrical sleeve 13 having no rigidity is prepared by injection molding the resin in substantially the same manner as in the first embodiment as described hereinabove and the ferrule bore 5 is formed in the sleeve 13 as a bore having a predetermined accuracy of dimension, having a circumference of its inner bore 13a corresponding to an outer circumference of the ferrule 4 of the optical fiber connecter 7, having a constant sleeve thickness and requiring no circularity. The sleeve 13 is mounted to the housing 6 by fixing the sleeve 13 to the sleeve bore 16 of the housing 6 with an elastic adhesive 19 of a silicone rubber type and the optical semiconductor element 11 is aligned with and fixed to the housing 6 so as to enable the optical axis to converge onto the central portion on the bottom surface of the ferrule bore 5, followed by welding the optical semiconductor element 11 to the housing 6.

As the sleeve 13 is prepared by injection molding the resin so as to make it less rigid than the ferrule to be inserted thereinto, the sleeve 13 is allowed to be deformed together with the elastic adhesive 19 along the outer circumferential surface of the ferrule, thereby guiding the ferrule to a predetermined position of the ferrule bore 5 of the sleeve 13. Although the ferrule bore 5 is required to be arranged so as to be restored to its original shape with a high degree of reproductivity and thereby bale to guide the ferrule to its predetermined position, even if the insertion and the detachment of the sleeve 13 of the ferrule are repeated, no operation to ensure circularity and cylindricity is required unlike in the previous embodiment of the optical semiconductor module according to this invention. Further, no special operation is required because any deviation in the position of the sleeve 13 with respect to the outer diameter of the ferrule can be adjusted by aligning the optical semiconductor element 11 with the housing 6. As a result, the portion requiring highly accurate dimensions is restricted only to the sleeve bore 16 so that mass production of the sleeves 13 can be carried out because the desired dimensional accuracy of the sleeve bore 16 can be achieved in producing the mold.

Figure 7:
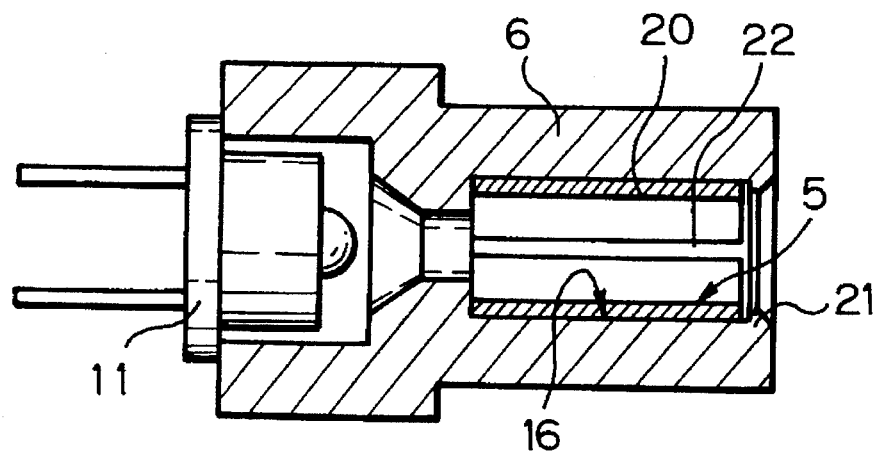
FIG. 7 is a cross-sectional view showing a fifth embodiment of this invention.

Fifth Embodiment:

FIG. 7 relates to the fifth embodiment of the optical semiconductor module according to this invention. As shown in FIG. 7, the housing 6 for fixing and holding the optical semiconductor element 11 is made of a metallic material and provided at its portion corresponding to the ferrule bore 5 of the sleeve 13 with a sleeve bore 16 having a diameter larger than that of the ferrule bore 5 and having a degree of accuracy as high as the accuracy of dimension required by the ferrule bore 5. On the other hand, the ferrule bore 5 is formed in a split sleeve 20 prepared by roll processing a plate material having a constant plate thickness so as to its outer circumferential part to be engaged with the sleeve bore 16 and for its inner circumferential part to be engaged with the ferrule in a predetermined dimension. Further, the split sleeve 20 is mounted in advance to the housing 6.

The split sleeve 20 is provided at an inner circumferential mouth edge of the sleeve bore 16 with a stopper portion 21 and projects therefrom so as to prevent detachment of the split sleeve 20 from the housing 6. Further, the split sleeve 20 is provided at its mating edges with a gap 22 at the time of the roll processing and the split sleeve 20 is inserted into the sleeve bore 16 of the housing 6 by narrowing the gap 22. Then, the optical semiconductor element 11 is aligned with the housing 6 so as for the optical axis to converge onto the central portion on the bottom surface of the ferrule bore 5 and it is fixed to the housing 6 by welding the optical semiconductor element 11 to the housing 6.

Generally, the ferrule bore 5 is required for guiding the ferrule to the predetermined position with high reproductivity even if the attachment and the detachment of the ferrule to and from the sleeve 13 are repeated many times. For this purpose, a bore having highly accurate dimensions is required. Further, control of surface roughness is required for suppressing the occurrence of worn particles so as to prevent a seizure upon attachment and detachment of the ferrule. Usually, many steps are required in order to finish a smooth surface in addition to providing a highly accurate dimension and shape, and a large number of finishing steps may lead to a poor yield of products. On the other hand, in the fifth embodiment of this invention, the accuracy of dimension and shape can be managed with respect to the sleeve bore 16 and the surface roughness can be managed with respect to the split sleeve 20. Further, as the material to be employed for the split sleeve 20, there may be employed a material having a low coefficient of friction, such as phosphorus bronze or beryllium copper, and such a material having a plate thickness of a high accuracy of dimension is commercially available leading to realizing low costs of production.

Figure 8:
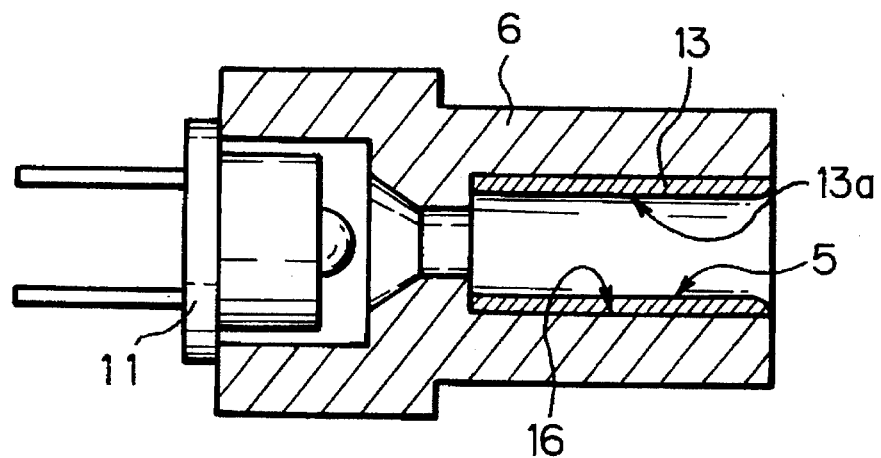
FIG. 8 is a cross-sectional view showing a sixth embodiment of this invention.

Sixth Embodiment:

FIG. 8 is directed to the sixth embodiment of the optical semiconductor module according to this invention. As shown in FIG. 8, the housing 6 for fixing and holding the optical semiconductor element 11, made of the metallic material, is provided with the sleeve bore 16 having a diameter larger to some extent than the diameter of the sleeve 13. The cylindrical sleeve 13 is prepared separately by injection molding the resin having elasticity in substantially the same manner as in the first embodiment of the optical semiconductor module according to this invention. On the other hand, the ferrule bore 5 is formed in the sleeve 13 as a bore having an outer size smaller to some extent than the inner diameter of the sleeve bore 16 and the outer circumference of its inner bore 13a at an accuracy of dimension as high as the length of the ferrule 4, and having a constant plate thickness and requiring no circularity. Then, the sleeve 13 is squeezed and pressed into the sleeve bore 16 of the housing 6 and, thereafter, the optical semiconductor element 11 is aligned with the housing 6 so as for the optical axis to converge onto the central portion on the bottom surface of the ferrule bore 5, followed by welding the optical semiconductor element 11 to the housing 6.

Generally, the ferrule bore 5 is required for the function of guiding the ferrule to the predetermined position with high reproductivity even if the attachment and the detachment of the ferrule to and from the sleeve 13 are repeated many times. Further, it is necessary to prevent any gap from existing between the ferrule bore of the sleeve 13 and the ferrule. The diameter of the ferrule bore 5 is formed from elastic resin to be smaller than that of the ferrule, so that upon press fitting of the ferrule into the bore under light pressure, the bore expands slightly thus accommodating the ferrule without any gap existing therebetween. The ferrule is usually be made of a stainless steel or a ceramic material and is highly rigid. Further, the surface of the ferrule is finished to be smooth. On the other hand, the sleeve 13 is so elastic that the ferrule comes into tight engagement with the ferrule bore 5 without forming any gap therebetween.

If the pressing-in force of the sleeve 13 is greater than the force of attaching or detaching the ferrule, the pressing-in force can be made smaller by making a coefficient of wear at the pressing-in portion larger. Hence, it is desired that the amount of deformation of the ferrule bore 5 is minimized. The mounting of the sleeve 13 to the housing 6 can be effected with ease simply by pressing the sleeve 13 into the housing 6 without requiring adhesion or welding because the sleeve 13 is of a simple cylindrical shape. Thus, the method according to this invention for mounting the sleeve 13 to the housing 6 is so simple that the process can be automatically carried out using a robot or the like.

Figure 9:
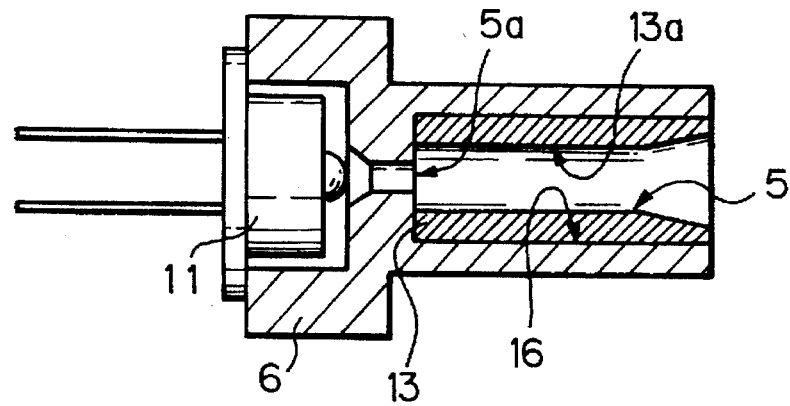
FIG. 9 is a cross-sectional view showing a seventh embodiment of this invention.
Figure 10:
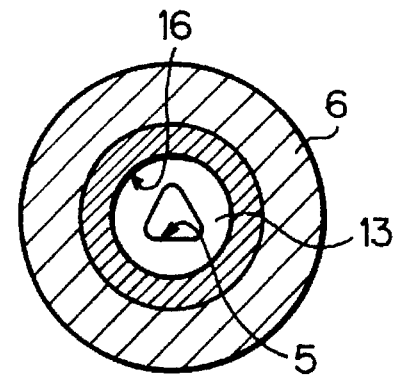
FIG. 10 is a cross-sectional view showing the essential portion of the optical semiconductor module of FIG. 9, when looked in the direction perpendicular to the lengthwise axes of the housing and the sleeve, in order to indicate the state of connection of the housing with the sleeve.
Figure 11:
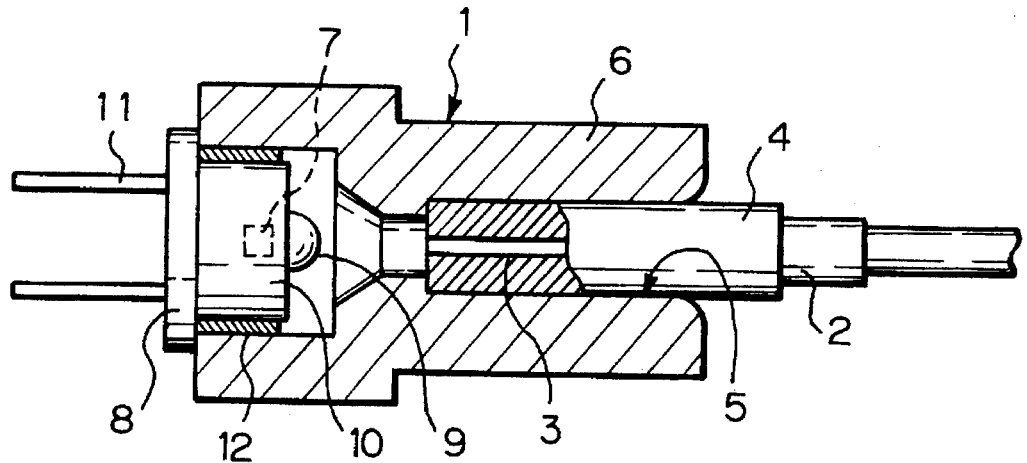
FIG. 11 is a cross-sectional view showing an example of the conventional optical semiconductor modules.

Seventh Embodiment:

FIG. 9 is directed to the seventh embodiment of the optical semiconductor module according to this invention. As shown in FIG. 9, reference numeral 13 denotes a sleeve that is a cylindrical part having a ferrule bore 5 in a triangular shape, as shown in FIG. 10, in which the inscribed circle of the triangular ferrule bore 5 is smaller by a predetermined amount than the outer diameter of the ferrule and the circumference thereof is longer than the outer circumference of the ferrule. The sleeve 13 may be prepared by injection molding a resin separately from the housing 6 by injecting the resin through the gate 15 in a combination of a lower mold section 14a and an upper mold section 14b with a core pin 14c, as shown in FIG. 2. The resin may be formulated by admixture with an inorganic material, such as finely divided powders of potassium titanate or glass beads or tungsten carbide whisker, so as to have a thermal coefficient of expansion substantially equal to or similar to the metallic material used for the housing 6. Then, the sleeve 13 is inserted into the sleeve bore 16 of the housing 6 having the shape as shown in the drawing and attached thereto with an adhesive, followed by aligning the optical semiconductor element 11 with the housing 6 so as for the optical axis to converge onto the central portion on the bottom Surface of the ferrule bore 5 and thereafter fixing the optical semiconductor element 11 to the housing 6 by welding.

It is to be noted that the sleeve 13 is arranged in such a manner that the intensity of the sleeve is lower than that of the ferrule because the inscribed circle of the ferrule bore 5 is set to be smaller by a predetermined amount than the outer diameter of the ferrule, its circumference is set to be longer than the outer circumference of the ferrule and its intensity is lower than that of the ferrule, and it is made of the resin. With the arrangement of the sleeve 13, it is elastically deformed and it can hold the ferrule at three points when the ferrule is inserted into the sleeve 13. Therefore, as the ferrule is supported by the inner bore 13a of the sleeve 13, i.e. as it is supported at three points by the ferrule bore 5, it undergoes a centripetal action and is allowed to be located in the central position of the ferrule bore 5.

It can be noted herein that the optical semiconductor module according to this invention can be prepared in an economical manner as each of the parts constituting the optical semiconductor module is suitable for mass production as in the manner described hereinabove and they can automatically be assembled with each other. In either case, any Gap occurring between the sleeve and the ferrule can be minimized at the time when the ferrule is inserted into the sleeve, thereby achieving improvements in performance of the optical semiconductor module to a remarkably high extent.

Further, the method according to this invention can form the ferrule bore in the sleeve, which has an inner circumferential portion of highly accurate dimensions, by preparing the cylindrical sleeve from an injection molded resin having a thermal coefficient of expansion similar to that of the housing by adding thereto the inorganic material as described hereinabove.

In addition, as the cylindrical sleeve is provided at its outer circumferential portion with the elastically deformable projection portions and the sleeve can be pressed into and fixed to the housing, assembly work for assembling the sleeve with the housing can be carried out efficiently because the sleeve is mountable to the housing without adhesion or welding.

Furthermore, the method according to this invention requires no special step for assembling the sleeve with the housing because the sleeve is assembled with the housing at the time of molding.

The present invention offers the advantage that, as the sleeve is formed as to be less rigid than the ferrule to be inserted into the sleeve, the sleeve can be deformed to match the shape of the ferrule, together with the elastic adhesive, upon engagement of the ferrule with the sleeve, and the ferrule is guided to the predetermined position in the ferrule bore.

Further, the present invention enables automatic assembly with ease because the housing is provided in advance at the portion corresponding to the ferrule bore with the accurate sleeve bore having the diameter larger than that of the ferrule bore and having the accuracy of dimension as high as the ferrule with the accuracy of dimension required by the ferrule bore; the ferrule bore is formed in the split sleeve prepared by roll processing the plate material having a constant plate thickness so as for its outer size to be engaged with the sleeve bore and for its inner size to be engaged with the ferrule bore in a predetermined dimension; the split sleeve is fixed in advance to the housing for fixing and holding the optical semiconductor element, made of the metallic material; and the optical semiconductor element is fixed to the housing by aligning the optical semiconductor element with the housing so as for the optical axis of the optical semiconductor element to coincide with the central optical axis of the ferrule bore.

In addition, the present invention enables an efficient automatic operation because the housing is provided in advance at the portion corresponding to the ferrule bore with a sleeve bore having the diameter larger than the diameter of the ferrule bore; the cylindrical sleeve is prepared separately by injection molding the resin having elasticity and provided with the ferrule bore as a bore having its outer size smaller than the sleeve bore and the circumference of its inner circumferential portion as accurate by the predetermined dimension as the length of the ferrule, having the constant sleeve thickness and requiring no circularity; the sleeve is squeezed and pressed in advance into the housing for fixing and holding the optical semiconductor element, the housing being made of a metallic material; and the sleeve is mounted to the housing simply by pressing the sleeve into the housing without adhesion or welding.

In addition, the present invention enables the ferrule to be readily inserted into and held by the sleeve because the sleeve is provided with a triangular ferrule bore.

What is claimed is:

1. An optical semiconductor module for use in optical communications, said module adapted to connect an optical semiconductor element to an optical fiber connector, said module comprising:
   a housing, said semiconductor element being mountable on said housing; said housing having a bore therein; and,
   a sleeve having an outer circumferential surface, said sleeve is adapted to fit within said bore, said sleeve having an inner bore adapted to receive said optical fiber connector; said sleeve having a plurality of flexible projecting extending from the outer circumferential surface, said projecting portions adapted to hold the sleeve within the bore.

2. The optical semiconductor module recited in claim 1, wherein the projecting portions have a saw tooth cross-section.

3. An optical semiconductor module for use in optical communications, said module adapted to connect an optical semiconductor element to an optical fiber connector having a ferrule, said module comprising:
   a housing, said semiconductor element being mountable on said housing, said housing having a bore therein, and;
   a sleeve adapted to fit within said bore; said sleeve having a ferrule bore adapted to receive said ferrule of said optical fiber connector;
   wherein said housing is made of a metallic material, said sleeve is made of a resin material, said resin material having an inorganic material mixed therein to provide said sleeve with a thermal coefficient of expansion substantially equal to the thermal coefficient of expansion of said housing.

4. The optical semiconductor module as claimed in claim 3, wherein said inorganic material is selected from a group consisting of powders of potassium titanate, glass beads and tungsten carbide whisker.

5. The optical semiconductor module as claimed in claim 3 or 4, further comprising an adhesive disposed between the housing and the sleeve, wherein said sleeve is fixed to said housing with the adhesive.

6. The optical semiconductor module as claimed in claim 3, wherein said sleeve is prepared by injection molding.

7. An optical semiconductor module for use in optical communications, said module adapted to connect an optical semiconductor element to an optical fiber connector having a ferrule, said module comprising:
   a housing, said semiconductor element being mountable on the housing; said housing having a bore therein; and
   a sleeve adapted to fit within said bore; said sleeve having a ferrule bore adapted to receive said ferrule of said optical fiber connector;
   wherein, said sleeve having an outer circumferential portion, a plurality of flexible projection portions are provided at said outer circumferential portion of said sleeve, whereby said sleeve is adapted to be squeezed radially and pressed into said bore of said housing so said projection portions hold said sleeve within the bore.

8. The optical semiconductor module as claimed in claim 7, wherein each of said projection portions has a sawtooth-shaped form in section.

9. An optical semiconductor module for use in optical communications, said module adapted to connect an optical semiconductor element to an optical fiber connector having a ferrule, said module comprising:
   a housing, said semiconductor element being mountable on the housing; said housing having a bore therein; and,
   a sleeve adapted to fit within said bore; said sleeve having a ferrule bore adapted to receive said ferrule of said optical fiber connector;
   wherein said sleeve is made of an elastic a resin material and has a constant wall thickness, and an adhesive having an elasticity after curing that fixes said sleeve to said housing.

10. An optical semiconductor module comprising:
    optical semiconductor element,
    housing for supporting said optical semiconductor element, said housing having a bore, and
    a cylindrical sleeve having an inner bore and fixed to said bore wherein said sleeve has a coefficient of thermal expansion that is substantially the same as a coefficient of thermal expansion of the housing, and
    wherein said bore has a diameter larger than the diameter of said ferrule bore, and a split sleeve having a constant thickness is disposed within and fixed to said sleeve bore.

11. The optical semiconductor module as claimed in claim 10, wherein said housing includes a stopper portion that prevents said sleeve from being detached from said housing, said stopper portion being formed at an opening edge of sleeve bore and an edge portion of said split sleeve is arranged so as to be engaged with said stopper portion.

12. An optical semiconductor module for use in optical commuications, said module adapted to connect an optical semiconductor element to an optical fiber connector having a ferrule, said module comprising:

a housing, said semiconductor element being mountable on the housing; said housing having a bore therein; and a sleeve adapted to fit within said bore; said sleeve having a ferrule bore adapted to receive said ferrule of said optical fiber connector;

wherein said bore in said housing has a diameter larger than said ferrule bore, said sleeve is made of a resin material and has constant wall thickness and is elastic, a circumference of an inner bore of said sleeve is a length corresponding to an outer circumference of said ferrule; and said sleeve is pressed into said bore of said housing and fixed to said bore thereof.

13. An optical semiconductor module for use in optical communications, said module adapted to connect an optical semiconductor element to an optical fiber connector having a ferrule, said module comprising:

a housing, said semiconductor element being mountable on the housing; said housing having a bore therein; and a sleeve adapted to fit within said bore; said sleeve having a ferrule bore adapted to receive said ferrule of said optical fiber connector;

wherein said sleeve is made of a resin material having elasticity and has an inner bore, said inner bore is of a generally triangular shape in section, an inscribed circle of said triangular inner bore has a diameter smaller than an outer diameter of said ferrule, and a circumferential length of said triangular inner bore is longer than an outer circumferential length of said ferrule.

14. The optical semiconductor modules as claimed in claim 13, wherein said housing is made of a metallic material and said sleeve is made of the resin material with an inorganic material mixed therein so that the thermal coefficient of expansion of said sleeve is substantially equal to the thermal coefficient of expansion of said housing.

15. The optical semiconductor module as claimed in claim 14, wherein said inorganic material selected from the group of is potassium titanate, glass beads, and tungsten carbide whisker.

16. The optical semiconductor module as claimed in claim 13, further comprising on adhesive, wherein said sleeve is fixed to said housing with adhesive.

17. An optical semiconductor module for use in optical communications, said module adapted to connect an optical semiconductor element to an optical fiber connector, said module comprising:

a housing formed of metallic material, said semiconductor element being mountable on said housing; said housing having a bore therein;

a sleeve adapted to fit within said bore, said sleeve being formed of resin, said sleeve having an inner bore adapted to receive said optical fiber connector;

wherein said sleeve has a thermal coefficient of expansion substantially equal to the coefficient of expansion of said housing; and wherein a predetermined amount of inorganic material is mixed with the resin that forms the sleeve, and the coefficient of thermal expansion of said resin is modified by mixing the inorganic material with the resin.

18. An optical semiconductor module for use in optical communications said module adapted to connect an optical semiconductor element to an optical fiber connector, said module comprising:

a housing formed of metallic material said optical semiconductor element being mountable on said housing, said housing having a bore therein;

a sleeve adapted to fit within said bore, said sleeve being form of resin, said sleeve having an inner bore adapted to receive said optical fiber connector, wherein said sleeve has a thermal coefficient of expansion substantially equal to the coefficient of expansion of said housing; and an adhesive disposed between the optical fiber connector and the bore in the housing, said adhesive fixing the optical fiber connector to the housing.

19. An optical semiconductor module for use in optical communications, said module adapted to connect an optical semiconductor element to an optical fiber connector, said module comprising:

a housing formed of metallic material, said semiconductor element being mountable on said housing; said housing having a bore therein;

a sleeve adapted to fit within said bore, said sleeve being formed of an elastic resin material said sleeve having an inner bore adapted to receive said optical fiber connector; and, an adhesive that fixes the optical fiber connector in the inner bore, said adhesive being elastic after curing.

20. An optical semiconductor module for use in optical communications, said module adapted to connect an optical semiconductor element to an optical fiber connector, said module comprising:

a housing formed of metallic material, said semiconductor element being mountable on said housing; said housing having a bore therein;

a sleeve adapted to fit within said bore, said sleeve being formed of an elastic resin material said sleeve having an inner bore adapted to receive said optical fiber connector;

an adhesive that fixes the optical fiber connector in the inner bore, said adhesive being elastic after curing; and wherein the sleeve has a constant wall thickness and an outer diameter, and the bore in the housing has a bore diameter, said outer diameter of the sleeve being greater than the bore diameter, and a radial compressive force being created when the sleeve is disposed in the bore, wherein the sleeve is held in place by the radial compressive force.

21. A method for the preparation of an optical semiconductor module of a receptacle type having an optical semiconductor element, a housing for supporting said optical semiconductor element and a ferrule bore formed in said housing and engaged with a ferrule of an optical fiber connector, comprising the step of:

forming a split sleeve having a constant thickness and an inner bore;

forming a sleeve bore in said housing for accommodating said sleeve in said housing;

fixing said sleeve to said housing by inserting said sleeve into said sleeve bore of said housing so as for said inner bore of said sleeve to be employed as a ferrule bore for inserting said ferrule; and aligning said optical semiconductor element with said housing so as to cause an optical axis of said optical semiconductor element to coincide with the central axis of said ferrule bore and fixing said optical semiconductor element to said housing.

22. A method for the preparation of an optical semiconductor module of a receptacle type having an optical semiconductor element, a housing for supporting said optical semiconductor element and a ferrule bore formed in said housing and engaged with a ferrule of an optical fiber connector, comprising the steps of:

forming a sleeve having an inner bore;

forming a sleeve bore in said housing for accommodating said sleeve in said housing;

fixing said sleeve to said housing by inserting said sleeve into said sleeve bore of said housing so as for said inner bore of said sleeve to be employed as a ferrule bore for inserting and ferrule;

aligning said optical semiconductor element with said housing so as to cause an optical axis of said optical semiconductor element to coincide with the central axis of said ferrule bore and fixing said optical semiconductor element to said housing; and wherein the step of forming said sleeve is performed by injection molding.

23. A method for the preparation of an optical semiconductor module of a receptacle type, having an optical semiconductor element, a housing for supporting said optical semiconductor element and a ferrule bore formed in said engaged with a ferrule of an optical fiber connector, comprising the step of:

forming a sleeve bore in said housing, said sleeve bore having a diameter larger than the diameter of said ferrule bore;

molding a sleeve with an inner bore having a predetermined dimension and a predetermined accuracy of dimension in said sleeve bore by arranging said housing in a mold and injecting a resin material into said sleeve bore; and said optical semiconductor element with said housing so as to cause an optical axis of said optical semiconductor element to coincide with the central axis of said ferrule bore and fixing said optical semiconductor element to said housing.

24. A method for forming an optical semiconductor module having a metal housing for supporting an optical semiconductor element and an optical fiber connector, comprising the steps of:

(a) forming a bore in the metal housing, said bore having a central axis;

(b) forming a sleeve with a resin that is adapted to be placed within said bore in the housing, said sleeve having a inner bore;

(c) fixing said sleeve in said bore in said housing;

(d) attaching the optical fiber connector to the housing at the sleeve using an adhesive;

(e) mounting the optical semiconductor element to the housing said optical semiconductor having an optical axis;

(f) aligning said optical semiconductor element with said housing to cause an optical axis of said optical semiconductor element to coincide with the central axis of said bore; and, (g) fixing said optical semiconductor element to said housing.

25. The method recited in claim 24 wherein step (g) is performed by welding.

26. A method for forming an optical semiconductor module having a metal housing for supporting an optical semiconductor element and an optical fiber connector, comprising the steps of:

(a) forming a bore in the metal housing, said bore having a central axis;

(b) forming a sleeve with a resin that is adapted to be placed within said bore in the housing, said sleeve having a inner bore;

(c) fixing said sleeve in said bore in said housing;

(d) attaching the optical fiber connector to the housing at the sleeve;

(e) mounting the optical semiconductor element to the housing said optical semiconductor having an optical axis;

(f) aligning said optical semiconductor element with said housing to cause an optical axis of said optical semiconductor element to coincide with the central axis of said bore;

(g) fixing said optical semiconductor element to said housing; and wherein step (b) includes forming the sleeve within the bore in the housing by injection molding the resin in the bore.

27. A method for forming an optical semiconductor module having a metal housing for supporting an optical semiconductor element and an optical fiber connector, comprising the steps of:

(a) forming a bore in the metal housing, said bore having a central axis;

(b) forming a sleeve with a resin that is adapted to be placed within said bore in the housing, said sleeve having a inner bore;

(c) fixing said sleeve in said bore in said housing;

(d) attaching the optical fiber connector to the housing at the sleeve;

(e) mounting the optical semiconductor element to the housing said optical semiconductor having an optical axis;

(f) aligning said optical semiconductor element with said housing to cause an optical axis of said optical semiconductor element to coincide with the central axis of said bore;

(g) fixing said optical semiconductor element to said housing; and wherein step (b) includes forming a plurality of projections on an exterior circumference of the sleeve.

28. A method for forming an optical semiconductor module having a metal housing for supporting an optical semiconductor element and an optical fiber connector, comprising the steps of:

(a) forming a bore in the metal housing, said bore having a central axis;

(b) forming a sleeve with a resin that is adapted to be placed within said bore in the housing, said sleeve having a inner bore;

(c) fixing said sleeve in said bore in said housing;

(d) attaching the optical fiber connector to the housing at the sleeve;

(e) mounting the optical semiconductor element to the housing said optical semiconductor having an optical axis;

(f) aligning said optical semiconductor element with said housing to cause an optical axis of said optical semiconductor element to coincide with the central axis of said bore;

(g) fixing said optical semiconductor element to said housing; and wherein the resin used in step (b) includes inorganic material therein, and wherein the resin having the inorganic material therein has a coefficient of thermal expansion that is substantially the same as a coefficient of thermal expansion of the housing.

29. A method for forming an optical semiconductor module having a metal housing for supporting an optical semiconductor element and an optical fiber connector, comprising the steps of:

(a) forming a bore in the metal housing, said bore having a central axis;

(b) forming a sleeve with a resin that is adapted to be placed within said bore in the housing, said sleeve having a inner bore;

(c) fixing said sleeve in said bore in said housing;

(d) attaching the optical fiber connector to the housing at the sleeve;

(e) mounting the optical semiconductor element to the housing said optical semiconductor having an optical axis;

(f) aligning said optical semiconductor element with said housing to cause an optical axis of said optical semiconductor element to coincide with the central axis of said bore;

(g) fixing said optical semiconductor element to said housing; and wherein step (b) includes injection molding the sleeve.

* * * * *